United States Patent
Huang et al.

(10) Patent No.: US 8,438,311 B2
(45) Date of Patent: May 7, 2013

(54) IMAGE PROCESSING METHOD AND IMAGE DISPLAY SYSTEM

(75) Inventors: Tzu-Chuan Huang, Hsinchu Hsien (TW); Kuo-Chuan Huang, Hsinchu Hsien (TW); Ming-Chang Lee, Hsinchu Hsien (TW); Cheng-Hsueh Hsieh, Hsinchu Hsien (TW)

(73) Assignee: MSTAR Semiconductor, Inc., Hsinchu Hsien (TW)

( * ) Notice: Subject to any disclaimer, the term of this patent is extended or adjusted under 35 U.S.C. 154(b) by 313 days.

(21) Appl. No.: 12/609,755

(22) Filed: Oct. 30, 2009

(65) Prior Publication Data
US 2010/0180049 A1 Jul. 15, 2010

(30) Foreign Application Priority Data
Jan. 9, 2009 (TW) ................................ 98100775 A (51) Int. Cl.
*G06F 15/16* (2006.01)
(52) U.S. Cl.
USPC ........... 709/246; 709/232; 709/233; 709/234; 725/87
(58) Field of Classification Search .................... None
See application file for complete search history.

(56) References Cited

U.S. PATENT DOCUMENTS

| | | | |
|---|---|---|---|
| 6,128,668 A * | 10/2000 | Barber et al. | 709/246 |
| 6,463,432 B1 * | 10/2002 | Murakawa | 1/1 |
| 7,426,058 B2 * | 9/2008 | Suzuki et al. | 358/1.18 |
| 7,844,848 B1 * | 11/2010 | Hobbs | 713/400 |
| 2004/0003117 A1 * | 1/2004 | McCoy et al. | 709/246 |
| 2005/0108506 A1 * | 5/2005 | Jung et al. | 712/208 |
| 2005/0117640 A1 * | 6/2005 | Han | 375/240.03 |
| 2006/0104255 A1 * | 5/2006 | Kido et al. | 370/345 |
| 2007/0201839 A1 * | 8/2007 | Murakami | 386/125 |
| 2008/0012737 A1 * | 1/2008 | Youm et al. | 341/51 |
| 2008/0131074 A1 * | 6/2008 | Baba et al. | 386/65 |

* cited by examiner

*Primary Examiner* — Duyen Doan
(74) *Attorney, Agent, or Firm* — WPAT, PC; Justin King (57) ABSTRACT

An image processing method applied to an image display system is provided. The image processing method comprises generating a statistic data according to a transmitting time of at least one image from an image transmitting end to an image receiving end and a processing time for displaying the at least one image at the image receiving end, generating a parameter data according to a predetermined time interval and the statistic data, transmitting the parameter data from the image receiving end to the image transmitting end, and adjusting an appointed image according to the parameter data to generate an adjusted image, and transmitting the adjusted image from the image transmitting end to the image receiving end. Accordingly, images are displayed on the image display system at a constant interval.

10 Claims, 5 Drawing Sheets

IMAGE PROCESSING METHOD AND IMAGE DISPLAY SYSTEM

CROSS REFERENCE TO RELATED PATENT APPLICATION

This patent application is based on Taiwan, R.O.C. patent application No. 098100775 filed on Jan. 9, 2009.

FIELD OF THE INVENTION

The present invention relates to an image processing method and an associated image display system, and more particularly, to an image processing method and an associated image display system capable of displaying images at a constant time interval.

BACKGROUND OF THE INVENTION

Nowadays, as the application of network technology becomes popular, people can share data with friends over the ubiquitous networks. Take the web photo album for example, one can upload photos to be shared with others to a network server and anyone who is interested in the photos can appoint and see the photos. To see a photo, the image display system may need to transmit, decode, and display the photo file. The approaches for displaying photos in the web photo album can be displaying a photo that is individually appointed one at a time or displaying photos that are appointed as a group one after another. When the photos on the network server are sequentially displayed, observers can view the pictures more smoothly if the photos are displayed at an interval of a constant period such as every 5 seconds. However, it is quite frequent that the display delays for the reason that the transmission of the photo files takes too long time or the decoding of the photo files are too time-consuming.

Generally speaking, two main factors may influence image display on an image display system—one is the total processing time Ttotal of the images and the other is the quality of the images, and there is a trade-off between these two factors. When the total processing time Ttotal needs to be kept within a certain range such as a short, constant interval, the quality of the images may need to be degraded. For example, the files of the images are lossily compressed, the resolution of the images is reduced, or the parameters of the quality of the images are decreased. When the quality of the images needs to be maintained above a certain level, the total processing time of the images may need to be extended. For example, the transmitting time of large image files is increased, or the decoding time of high-quality images is prolonged. The total processing time Ttotal of an image includes image transmitting time Tt, image decoding time Td and image display time Tr. The image transmitting time Tt, from transmitting an image request till receiving an image, mainly comprises the time for transmitting a request over a network and the time for transmitting a reply image over the network, among which transmitting the reply image is the most time-consuming. When the bandwidth of the network has little variation during a short period or the network is a network with a quality of service (QoS), the most crucial factor for determining the image transmitting time Tt is the size of the image file. The image decoding time Td is a period needed for decoding the image before the image is displayed, and is corresponding to the size of the image file and the parameters of the image, e.g., formats, resolution, and compression parameters of the image. The image display time Tr is a period after the image is decoded till the image is displayed. When the total processing time Ttotal is calculated, the image display time Tr is so small, compared to the image transmitting time Tt and the image decoding time Td, that Tr can be neglected.

Figure 1:
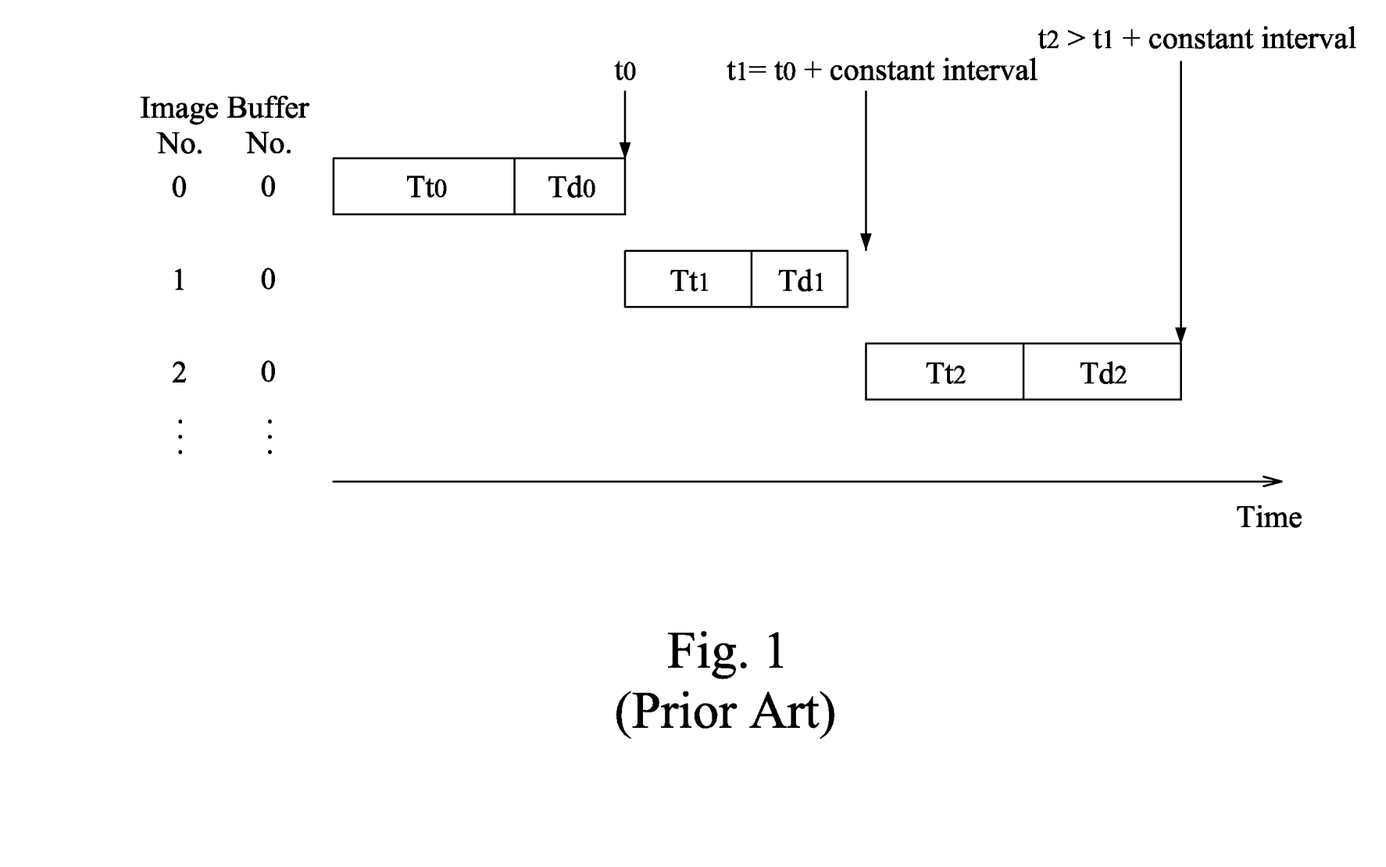
FIG. 1 is a timing diagram of transmitting and decoding images by a conventional image display method using a single buffer to display images at a constant interval.
Figure 2:
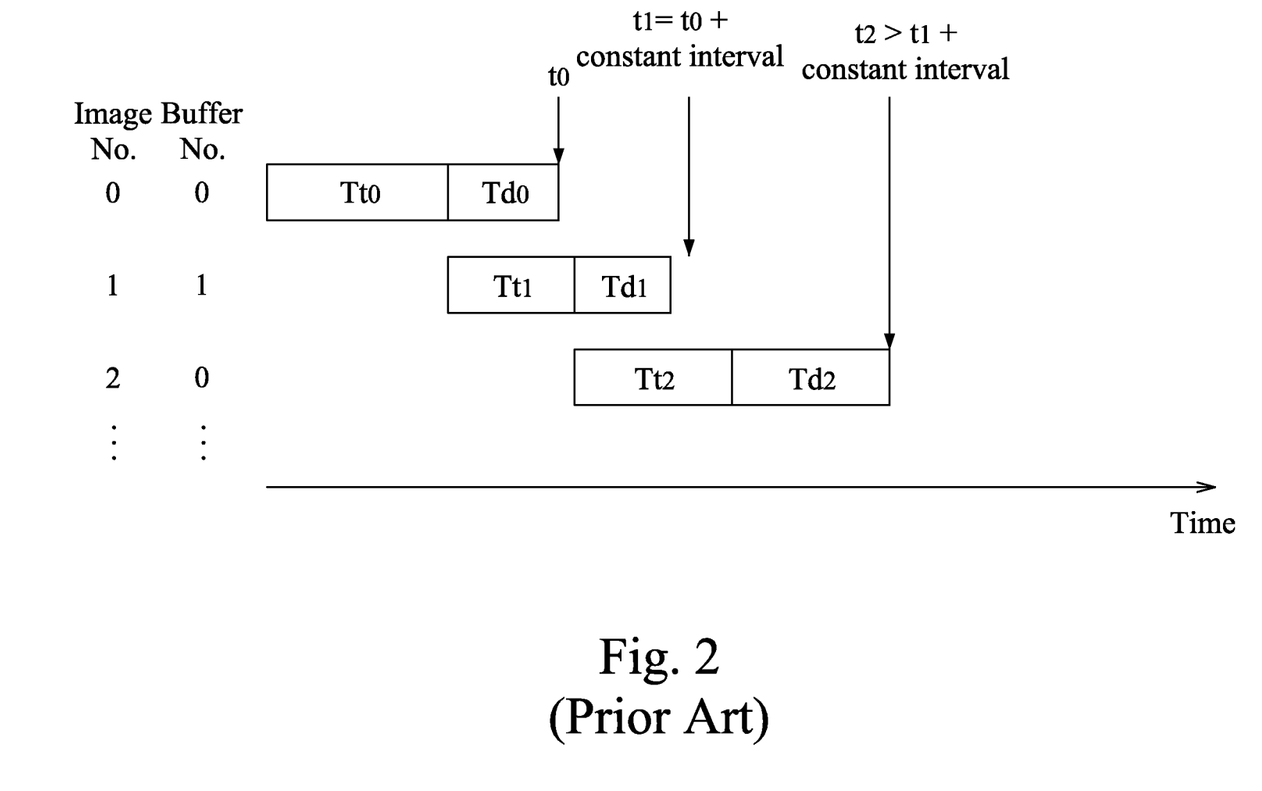
FIG. 2 is a timing diagram of transmitting and decoding images by a conventional image display method using double buffers to display images at a constant interval.

FIG. 1 and FIG. 2 show the timing diagrams of two conventional methods for displaying images at a constant interval. FIG. 1 shows a method using a single buffer, and FIG. 2 shows a method using double buffers. In FIG. 1, TdN represents the decoding time of the Nth image, TtN represents the transmitting time of the Nth image, and tN represents the display time point of the Nth image. Displaying images at a constant interval means that the display time point of a current image is expected to equal to the summation of the display time point of the previous image and the constant interval. Referring to FIG. 1, the summation of Tt1 and Td1 is smaller than the constant interval. That is, the transmitting time of image 1 added to the decoding time of image 1 is smaller than a predetermined constant interval, so that image 1 can be displayed at the intended display time point t1 of the image. On the contrary, the summation of Tt2 and Td2 is greater than the constant interval. That is, the transmitting time of image 2 added to the decoding time of image 2 is greater than the predetermined constant interval, so that image 2 cannot help but be displayed after the intended display time point of the image. In FIG. 2, two buffers are applied to simultaneously transmit and decode images by overlapping transmitting time and decoding time in parallel, so as to increase the efficiency of the image display system. Symbols TdN, TtN and tN in FIG. 2 are the same of those of FIG. 1, and they shall not be further described for brevity. Referring to FIG. 2, while image 0 is decoded on buffer 0, image 1 is concurrently transmitted to buffer 1. Similarly, while image 1 is decoded on buffer 1, image 2 is simultaneously transmitted to buffer 0. The method in FIG. 2 has better throughput than the method in FIG. 1; however, an additional buffer is needed for the method in FIG. 2. Furthermore, regardless of which of the methods in FIG. 1 or FIG. 2 is applied, when transmission or decoding of the image files gets too time-consuming, a result that the display time of an image exceeds a predetermined display time point is incurred. Therefore, it is an important subject of current image display field to provide a design capable of displaying images at a constant interval.

SUMMARY OF THE INVENTION

With respect to a disadvantage that a conventional image display method can not display images at a constant interval, one object of the present invention is to provide an image processing method capable of displaying images at a constant interval and an associated image display system.

An image processing method applied to an image display system is provided according to an embodiment of the present invention. The image display system comprises an image receiving end and an image transmitting end. The image receiving end connects to the image transmitting end over a network. The image processing method according to the present invention comprises generating a statistic data according a transmitting time of transmitting at least one image from the image transmitting end to the image receiving end and a processing time for decoding and displaying the at least one image at the image receiving end, generating a parameter data according to a predetermined time interval and the statistic data, transmitting the parameter data from the image receiving end to the image transmitting end, and adjusting a subsequent image according to the parameter data to generate an adjusted image at the image transmitting end and transmitting the adjusted image from the image transmitting end to the image receiving end.

An image display system is provided according to another embodiment of the present invention. The image display system comprises an image receiving end and an image transmitting end. The image receiving end comprises a control module for generating a parameter data according to a predetermined time interval and a statistic data. The image transmitting end comprises an image adjusting module for adjusting a subsequent image according to the parameter data, so as to generate an adjusted image. The image receiving end connects to the image transmitting end over a network.

DETAILED DESCRIPTION OF THE PREFERRED EMBODIMENT

In a conventional image display system using a network to display images or photos, the images or photos stored at an image transmitting end have different file sizes and image parameters. Processing times (including transmitting times and decoding times) of the images having different file sizes and image parameters are very different from one another. Consequently, a result that the images cannot be displayed at a constant time interval defined by a user happens frequently. Therefore, according to the invention, an image display system and an image processing method are provided. The image processing method comprises collecting statistic data of a plurality of images, generating a parameter data according to the statistic data and a user-defined time interval, providing the parameter data to an image transmitting end, and adjusting an appointed image at the image transmitting end according to the parameter data. The statistic data comprises file sizes, formats, parameters, transmitting times and decoding times of the images. Accordingly, a period of a transmitting time of the adjusted image added to a decoding time of the adjusted image is within the user-defined time interval.

Figure 3:
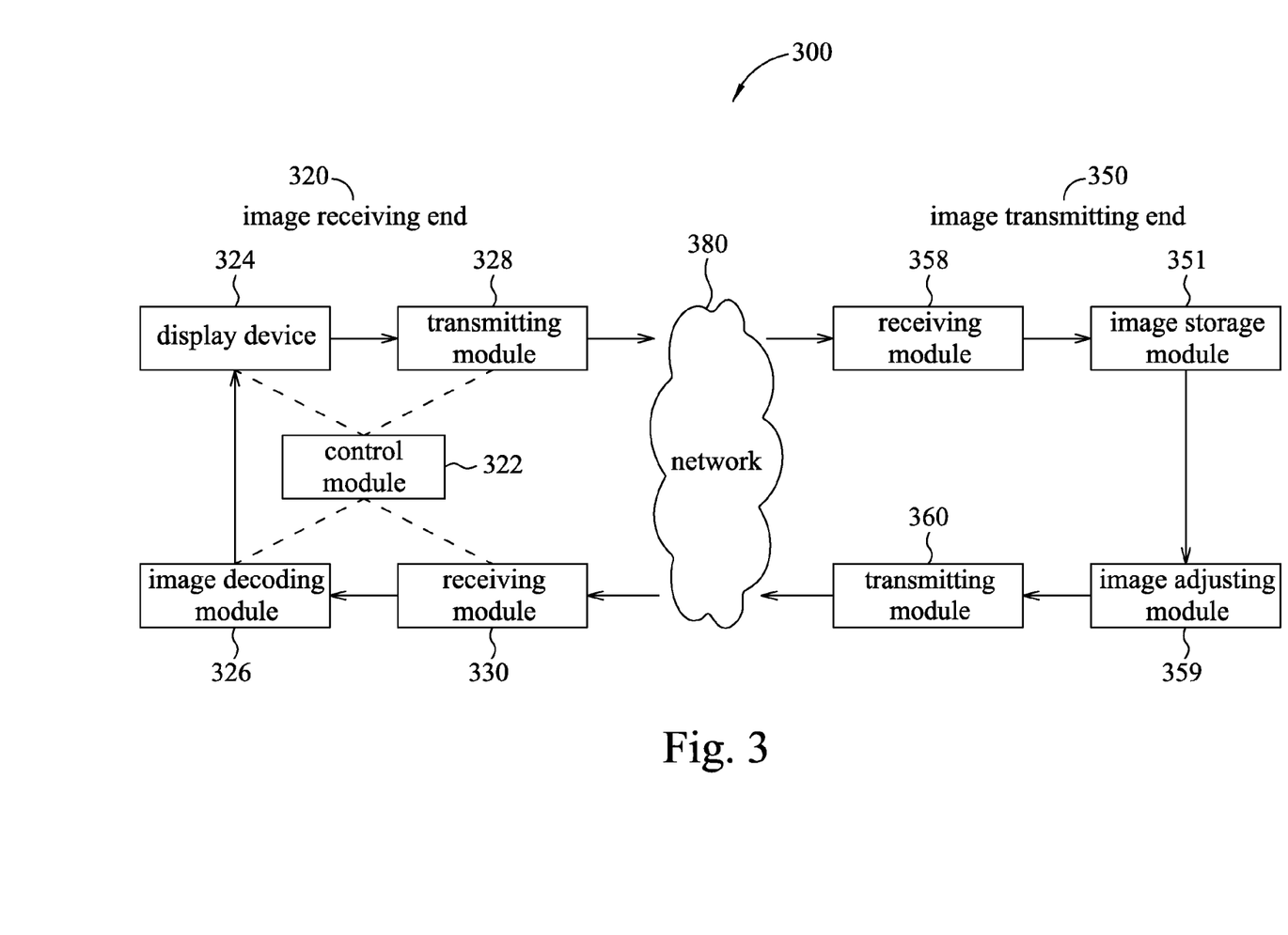
FIG. 3 is a schematic diagram of an image display system in accordance with an embodiment of the present invention.

Refer to FIG. 3 showing a schematic diagram of an image display system 300 in accordance with an embodiment of the present invention. The image display system 300 comprises an image receiving end 320 (a client) and an image transmitting end 350 (a server). The image receiving end 320 connects to the image transmitting end 350 over a network 380 for transmitting images and data. The image receiving end 320 comprises a control module 322, a display device 324, an image decoding module 326, a transmitting module 328, and a receiving module 330. The control module 322 generates a parameter data according to a user-defined constant interval and a statistic data. The display device 324 is used for displaying images. The image decoding module 326 decodes the images before the images are displayed. The transmitting module 328 is used for transmitting data, such as an image request signal of an appointed image or an image information request signal of an appointed image. The receiving module 330 receives images or data transmitted from the image transmitting end 350. The image transmitting end 350 comprises a receiving module 358, an image storage module 351, an image adjusting module 359 and a transmitting module 360. The receiving module 358 is used for receiving requests transmitted from the transmitting module 328. The transmitting module 360 is used for transmitting data such as images or image information to the image receiving end 320. The image storage module 351 stores images including the image information. The image adjusting module 359 adjusts an appointed image according to the parameter data to generate an adjusted image. In an embodiment, the receiving module 330 and the transmitting module 328 of the image receiving end 320 are respectively a receiving module and a transmitting module of a common network. The receiving module 358 and the transmitting module 360 of the image transmitting end 350 are also respectively a receiving module and a transmitting module of a common network.

Figure 4:
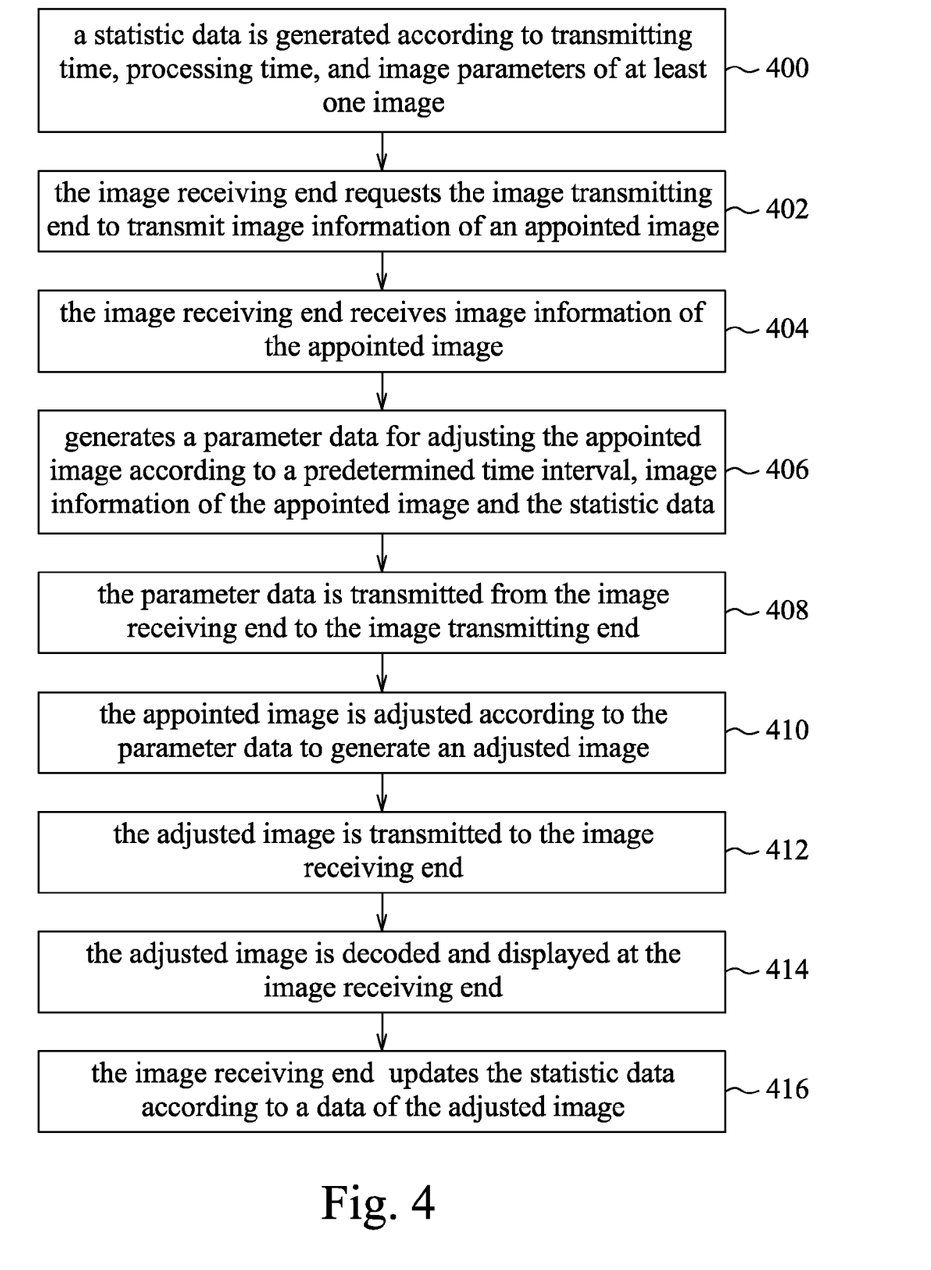
FIG. 4 is a flow chart of steps of an image processing method with a constant interval in accordance with an embodiment of the present invention.

Refer to FIG. 4 showing a flow chart of steps of an image processing method implementing a constant interval in accordance with a first embodiment of the invention. In Step 400, a statistic data is generated by collecting the image transmitting time from the image transmitting end to the image receiving end, the image decoding time at the image receiving end, the file size, and image parameters of at least one image In Step 402, the image receiving end 320 requests the image transmitting end 350 to transmit image information of an appointed image. In Step 404, the image receiving end 320 receives image information of the appointed image from the image transmitting end 350. In Step 406, a control module 322 of the image receiving end 320 calculates and generates a parameter data for adjusting the appointed image according to a predetermined user-defined time interval, image information of the appointed image and the statistic data. In Step 408, the parameter data is transmitted from the image receiving end 320 to the image transmitting end 350. In Step 410, an appointed image is adjusted at the image transmitting end 350 according to the parameter data to generate an adjusted image. In Step 412, the adjusted image is transmitted to the image receiving end 320. In Step 414, the adjusted image is decoded and displayed at the image receiving end 320. In Step 416, the control module 322 of the image receiving end 320 updates the statistic data according to a data of the adjusted image.

Following description is given with reference to FIG. 3 and FIG. 4 to better understand the invention. The receiving module 330 of the image receiving end 320 receives at least one image transmitted from the transmitting module 360 at the image transmitting end 350. Preferably, a plurality of images, e.g., 20 images, is received, and the 20 images are decoded by the image decoding module 326 and displayed on the display device 324. The control module 322 collects data of the 20 images to generate a statistic data as described in Step 400. The statistic data comprises the file size and image parameters of each of the 20 images, the transmitting time of each of the 20 images transmitted from the image transmitting end 350 to the image receiving end 320, the decoding time of each of the 20 images on the image decoding module 326, and the display time for displaying each of the 20 images on the display device 324. It is to be noted that the display time of each image is a period needed for completing the display of the image after the image are decoded. Compared to the transmitting time and the decoding time, the display time is relatively small and can be neglected in real applications. In an embodiment, the control module 322 comprising a central processing unit (CPU) or a microprocessor executing software program designed in advance to achieve the object of collecting statistic data. For example, the control module 322 records a start time point of transmitting a request signal to the image transmitting end 350 and an end time point of receiving an image file in response to the request signal at the image receiving end, so as to obtain a transmitting time of the image. Since the time of transmitting the request signal to the image transmitting end 350 is very short compared to the time of receiving the image, the transmitting time may be regarded as the time for transmitting the image from the image transmitting end 350 to the image receiving end 320. In addition, the control module 322 also records a start time point and an end time point of the decoding to further obtain a decoding time of each of the 20 images.

In Step 402, the control module 322 requests the image transmitting end 350 to transmit image information of an appointed image to the image receiving end 320. The image information comprises a file size and image parameters of the appointed image. The image parameters can comprise, e.g., file format, resolution, and compression parameters of the appointed image. In an embodiment, the control module 322 generates an image information request signal corresponding to the image information of the appointed image and transmits the image information request signal to the image transmitting end 350 via the transmitting module 328 over the network 380, so as to request the image transmitting end 350 to transmit the image information of the appointed image.

Upon receiving the image information request signal at the image transmitting end 350 via the receiving module 358, the image storage module 351 is searched for getting the image information of the appointed image. Then, the image information of the appointed image is transmitted to the image receiving end 320 via the transmitting module 360, as in Step 404.

In Step 406, the control module 322 generates a parameter data for adjusting the appointed image according to a user-defined time interval, the image information of the appointed image and the statistic data. The parameter data comprises a file size, format and parameters of the image. The parameter data is for adjusting the image parameters of the appointed image so that the adjusted image can achieve the expected file size, image format and image parameters.

In Step 408, the control module 322 transmits the parameter data for adjusting the appointed image to the image transmitting end 350 via the transmitting module 328 over the network 380. In Step 410, upon receiving the parameter data, the image adjusting module 359 adjusts the appointed image stored in the image storage module 351 according to the parameter data, thereby generating the adjusted image. In an embodiment, the image adjusting module 359 comprises an image transcoder for performing transcoding such as changing the resolution, the image format, and the compression parameters of the appointed image according to the parameter data. The control module 322 can generate an image request signal for requesting the image transmitting end 350 to transmit the adjusted image, and the image request signal can be transmitted with the parameter data to the image transmitting end 350. Otherwise, the image request signal and the parameter data may be respectively transmitted to the image transmitting end 350. In Step 412, the image transmitting end 350 transmits the adjusted image to the image receiving end 320 via the transmitting module 360 over the network 380.

In Step 414, upon receiving the adjusted image at the image receiving end 320, the control module 322 controls the image decoding module 326 to decode the adjusted image to be displayed on the display device 324 at the image receiving end 320. In an embodiment, the image decoding module 326 is hardware having a specific decoding function. In another embodiment, the image decoding module 326 is a CPU or a microprocessor that achieves the specific decoding function by executing software or a program designed in advance.

In Step 416, the control module 322 updates the statistic data according to the data of the adjusted image. For example, the file size, image parameters, the transmitting time and the decoding time of the adjusted image are updated to the statistic data. In an embodiment, only a latest predetermined amount of data is kept in the statistic data. For example, in the statistic data, 20 latest data is kept, and data prior to the 20 latest data is removed whenever the new data is added to the statistic data.

According to another embodiment of the present invention, similarly, a plurality of previous image data is collected at the image receiving end 320 to generate a statistic data. A parameter data is generated according to the statistic data and a user-defined time interval, and the parameter data comprises an upper-limit value of a file size and an upper-limit value of image parameters of the appointed image. According to the parameter data, the image transmitting end 350 can be informed the upper-limit values such as the file size, image resolution, and compression parameters of the image to be transmitted. From the foregoing description, in the image processing method according to the embodiment of the present invention, the parameter data is not calculated according to image information (e.g., a file size, an image format, and a resolution) of the next appointed image, so that image information of the next appointed image is not required before calculating the parameter data. Thus, the parameter data is transmitted to the image transmitting end 350, and the next appointed image is adjusted at the image transmitting end 350 according to the limit values of the parameter data, followed by transmitting the adjusted image to the image receiving end 320 to decode and display the received image.

Figure 5:
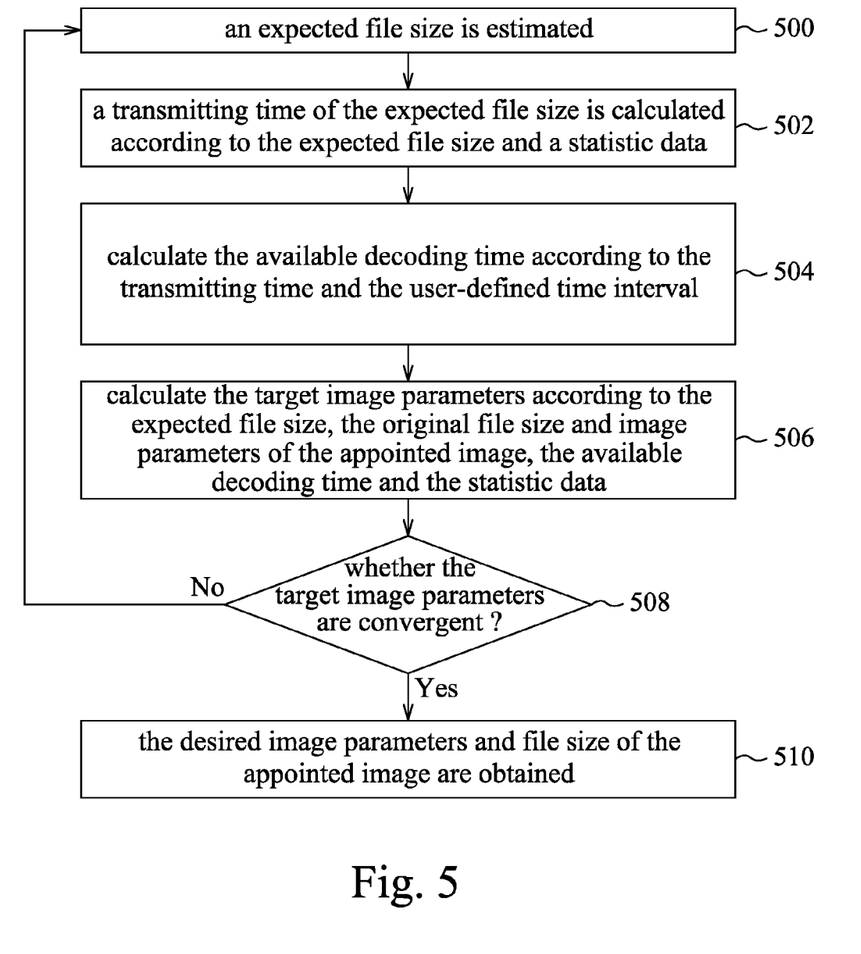
FIG. 5 is a flow chart of steps of calculating and generating parameter data by an image receiving end.

According to one embodiment of the present invention, how the control module 322 generates the foregoing parameter data shall be illustrated. Refer to FIG. 5 showing a flow chart of the control module 322 generating a parameter data in accordance with an embodiment of the present invention. The flow comprises the following steps. In Step 500, an expected file size is estimated. In Step 502, a transmitting time of the expected file size is calculated according to the expected file size and the statistic data. In Step 504, the available decoding time is calculated according to the transmitting time and a user-defined time interval. In Step 506, target image parameters are calculated according to the expected file size, an original file size and image parameters of an appointed image, an available decoding time and the statistic data. In Step 508, it is determined whether the calculation of Step 506 is convergent. When the answer is yes, Step 510 is performed; otherwise, the method returns to Step 500. In Step 510, desired image parameters and a file size of the appointed image are obtained.

In Step 500, the control module 322 estimates the expected file size, which is a desired file size value of the appointed image after being adjusted. In Step 502, the control module 322 calculates a transmitting time Tt of the expected file size according to a relationship between file sizes and the corresponding transmitting times in the statistic data. In Step 504, the control module 322 calculates the available decoding time Td according to the transmitting time Tt and the user-defined time interval. The available decoding time Td is equal to Ttotal-Tt-Tr, where the display time Tr can be neglected since it is quite small, and Ttotal is the user-defined time interval. In Step 506, the control module 322 calculates the target image parameters according to the expected file size, the original file size and image parameters (the image information) of the appointed image, the available decoding time and the statistic data. When calculating the target image parameters, the effective image parameters that meet the predetermined conditions can not always be obtained. For example, the target total processing time may exceed the user-defined time interval or it's not feasible to adjust appointed image according to the target image parameters. That is, the calculated target parameters become divergent and not effective. In Step 508, thus, it is determined whether the calculated image parameters are convergent. When the answer is yes, Step 510 is performed. In Step 510, the desired image parameters and file size of the appointed image are obtained; otherwise, the method returns to Step 500 and go over the steps. In Step 500, the expected file size is estimated again. The foregoing parameter data comprises image parameters and the file size of the adjusted image.

In conclusion, according to the image processing method and the image display system of the present invention, a plurality of statistic data such as file sizes, image parameters, transmitting times and decoding times of images is first collected. A parameter data is generated according to the statistic data and a user-defined time interval. Then, a next appointed image is adjusted at the image transmitting end according to the parameter data. The user-defined time interval, network transmitting times and the decoding times are taken into consideration when generating the parameter data. Therefore, the image processing method and the image display system according to the present invention are capable of achieving the object of displaying images at a constant interval.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, applied to an image display system comprising an image receiving end and an image transmitting end, which the image receiving end and the image transmitting end are connected to each other over a network, comprising:
    generating a statistic data according to a first transmitting time of transmitting at least one image from the image transmitting end to the image receiving end and a first processing time for decoding and displaying the at least one image at the image receiving end;
    transmitting an image information request signal from the image receiving end to the image transmitting end;
    transmitting image information of a subsequent image from the image transmitting end to the image receiving end in response to the image information request signal;
    generating a parameter data according to a predetermined time interval and the statistic data;
    transmitting the parameter data from the image receiving end to the image transmitting end; and
    adjusting the subsequent image according to the parameter data to generate an adjusted image and transmitting the adjusted image from the image transmitting end to the image receiving end;
    wherein the step of generating the parameter data generates the parameter data further according to the image information of the subsequent image.

2. The image processing method as claimed in claim 1, wherein the statistic data comprises a file size of the at least one image, image parameters of the at least one image, the first transmitting time, a decoding time for decoding the at least one image and a display time of displaying the at least one image on a display device.

3. The image processing method as claimed in claim 1, wherein the image display system displays images at the predetermined time interval.

4. The image processing method as claimed in claim 1, further comprising:
    transmitting an image request signal from the image receiving end to the image transmitting end, wherein the image request signal is for requesting the subsequent image.

5. The image processing method as claimed in claim 1, further comprising:
    generating an update data according to a second transmitting time of transmitting the second image from the image transmitting end to the image receiving end and a second processing time for decoding and displaying the second image; and
    updating the statistic data according to the update data.

6. The image processing method as claimed in claim 1, wherein the step of adjusting the subsequent image according to the parameter data comprises adjusting a file size and/or image parameters of the subsequent image.

7. An image display system, comprising:
    a first computing device functioning as an image receiving end, comprising:
    a memory;
    a processor a control module, for generating a parameter data according to a predetermined time interval and a statistic data; and
    a second computing device functioning as an image transmitting end, connected to the image receiving end over a network, comprising:
    a memory;
    a processor;
    an image adjusting module, for adjusting a subsequent image according to the parameter data to generate an adjusted image, transmitting image information of the subsequent image to the first computing device;
    wherein the control module further transmitting the parameter data to the second computing device, generates an image information request signal to be transmitted to the image transmitting end for requesting the image information of the subsequent image, and the parameter data is further generated according to the image information of the subsequent image, generates the statistic data according to a first transmitting time of transmitting at least one image from the image transmitting end to the image receiving end and a first processing time for decoding and displaying the at least one image at the image receiving end, generates an update data according to a second transmitting time of transmitting the second image from the image transmitting end to the image receiving end and a second processing time for decoding and displaying the second image, and the statistic data is updated according to the update data.

8. The image display system as claimed in claim 1, wherein the image receiving end further comprises:
    an image decoding module, for decoding images; and
    a display device, for displaying the images.

9. The image display system as claimed in claim 8, wherein the statistic data comprises a file size of the at least one image, image parameters of the at least one image, the first transmitting time, a decoding time of at least one image at the image decoding module, and a display time of displaying at least one image on the display device.

10. The image display system as claimed in claim 7, wherein the control module further generates an image request signal for requesting the subsequent image.

* * * * *